July 3, 1962 F. PAPKE 3,041,918
BLOCK TYPE ALBADA FINDER WITH CURVED PICTURE FRAME
Filed March 18, 1959 3 Sheets-Sheet 1
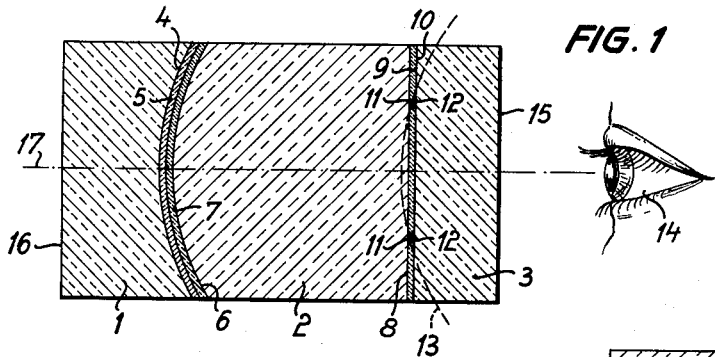
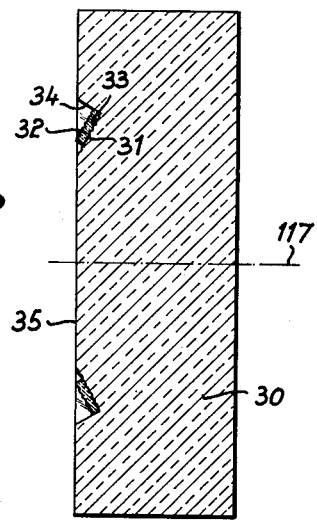
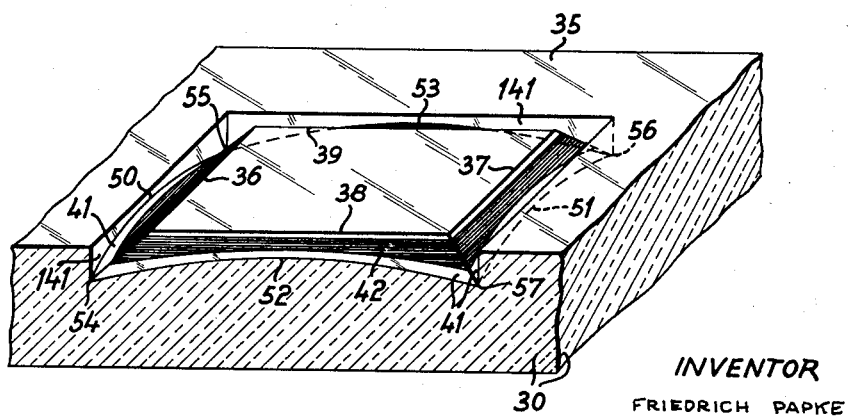
INVENTOR
FRIEDRICH PAPKE
BY
Mocket Blum
ATTORNEYS July 3, 1962 F. PAPKE 3,041,918
BLOCK TYPE ALBADA FINDER WITH CURVED PICTURE FRAME
Filed March 18, 1959 3 Sheets-Sheet 2

INVENTOR
FRIEDRICH PAPKE

July 3, 1962  F. PAPKE  3,041,918
BLOCK TYPE ALBADA FINDER WITH CURVED PICTURE FRAME
Filed March 18, 1959  3 Sheets-Sheet 3

INVENTOR
FRIEDRICH PAPKE
BY Mocket Blum
ATTORNEYS

United States Patent Office 3,041,918
Patented July 3, 1962

3,041,918
BLOCK TYPE ALBADA FINDER WITH CURVED PICTURE FRAME
Friedrich Papke, Braunschweig, Germany, assignor to Voigtlander A.G., Braunschweig, Germany, a corporation of Germany
Filed Mar. 18, 1959, Ser. No. 800,169
Claims priority, application Germany Mar. 22, 1958
13 Claims. (Cl. 88—1.5)

This invention relates to a photographic view finder and it has particular relation to an Albada finder for photographic purposes.

The so-called Albada finder has a partially permeable hollow mirror in its front part, in about the focal plane of which a frame to be reflected is arranged, and which is imaged by said hollow mirror at about infinity, so that it forms the boundary of the image field, as a free-standing frame, for the eye looking through the finder. Such finders are of very simple construction, but they have the known disadvantage that, due to the use of the hollow mirror surface of partial permeability, a considerable portion of the incident light is lost for the finder image and also for the illumination of the frame to be reflected. Many attempts have been made in order to overcome this disadvantage, obtain a satisfactory illumination of the frame, increase the brilliance of the finder and to reduce undesired reflections. Such attempts have included the known block constructions of Albada-finders, in which a light-permeable block of glass or synthetic plastic is inserted between the eyepiece lens and the outlook or front lens and is cemented together with the other optical elements.

It has been found that particularly favorable conditions for the illumination of the frame to be reflected can be obtained if this frame is applied to a spherical surface, the curvature of which meets the conditions of the light for illumination of the frame to be reflected being derived from that zone of the image field in which the frame appears. In the use of a block construction, the frame to be reflected is deposited by vaporization on the cemented surface—which is formed as a spherical surface—between the eyepiece lens and the intermediate block. In physico-optical respect, this arrangement has an excellent effect. However, the condition that the mirror or frame to be reflected, which is arranged on this cemented surface, should obtain its light from that part of the image field in which the frame appears, results in many cases in the necessity of forming this surface with a very sharp curvature, and this, in turn, results in several disadvantages. One disadvantage is that the manufacture of such sharply curved surfaces is expensive, because the optical fine processing involves a considerable amount of milling work or the like. Furthermore, now and then small lateral displacements of the frame, which become necessary in order to correct the position of the frame relative to the mechanical axis of the finder, cause considerable tilting of the last limiting surface of the finder. Such optical and manufacturing conditions can hardly be eliminated in mass production. Finally, it should be also mentioned that even small deviations in the index of refraction of the intermediate block of a block finder, from the frame carrier lens cemented thereto, cause—in view of the sharp curvature of the frame carrying surface—considerable optical deviations which adversely affect the desired effect of the finder. Thus, altogether, the considerable optical advantages, of a spherically curved carrier surface for the frame to be reflected, are off-set by hardly avoidable manufacturing and optical difficulties.

The main object of the present invention consists in eliminating the above described disadvantages and providing a finder which shows at least the same performance and the same brilliance of the reflected frame as that of an Albada-finder having a curved carrying-surface, but which can be more easily manufactured and the uniformity of which can be attained more easily.

The above described use of a spherical surface as the carrier for the frame to be reflected, which has certain advantages, has been eliminated in the present invention. According to this invention, the surface which carries the frame to be reflected and which may be located as a cementing surface between the intermediate glass block and the eyepiece member of the finder, is designed as a plane surface. However, those parts of this surface which carry the frame to be reflected are formed differently from the balance of the surface in such a manner that—like in the case of the above mentioned total surface of spherical shape—they obtain the light for the frame to be reflected from that part of the image field which is bordered by the frame. In order to attain this, the frame to be reflected can be arranged on a correspondingly inclined portion of the carrying surface. However, the surface portions supporting the frame can be provided further with a curvature in addition to the inclination, and which would be present at these points on the usual spherical surface which would have to be selected in order to obtain the light incident thereon from the image field of the finder, in the above described manner.

In further approximation of a spherical carrier zone, a correspondingly twisted surface can also be used. In this embodiment the frame carrying surface is also impressed in the object facing plane surface of the body which is transparent to the eye of the operator using the Albada-finder. Such impression is of at least such width as that of the reflecting frame to be carried by this surface. The contour of this surface corresponds in its shape to the contour of the frame to be reflected, whereby the distortion caused by the hollow mirror is taken into consideration and eliminated by a correspondingly opposite barrel-shaped curvature of the frame. According to this preferred embodiment of the invention, the inclination of this carrier surface relative to such plane surface of the glass body is different at the various spots and the curvature is non-uniform, as formed, for example, by twisting a plane surface. This twist is thereby shaped in such a manner that it ascends from a lowest corner edge up to the vertex of an arch and then descends in an opposite direction of twisting to the other lowest corner edge of this lateral surface of the frame carrier zone. Thereby, this twisted surface is aligned in such a manner that it corresponds to the tangent to a spherical surface which has been mentioned in the above description as preferred for that embodiment of the carrier surface for the frame to be reflected, by which the geometric-optical illumination conditions are taken into consideration in the best possible manner. Thus, this tangent would be always arranged at the spot, at which the frame would be applied to a spherical surface. In a finder having an over-all length of about 30 mm., a focal length of the mirror of 20 mm., an image angle of about 35°, for a format of 24 x 36 mm., for a carrier surface twisted according to the present invention, the following angles would result: in the middle of the broad side, about 8°; in the middle of the narrow side, about 9° and at the corners about 13°. The change from the middle to the outer inclination, takes place continuously. Due to this peculiarity, the corner edges of the impressed carrier zone extend somewhat further below the plane surface of the rear member of the finder, than the middle portions of their sides.

In addition to the twist decribed above, the carrier surface itself can be curved in outward direction from about the center of the frame, whereby the average radius of curvature of this surface in this direction approximately corresponds to the more usually used spherical surface.

Frame carrier surfaces of this type have—in comparison with the above described carrier surfaces which meet the optical requirements particularly well—in the form of impressed spherical surfaces, in a planely limited body at satisfactory approximation to the above mentioned shape, of spherical indentation, the essential advantage that they extend less deeply into the surface, i.e. from a groove of smaller depth in the surface, whereby the difficulties of applying the reflecting layer to this carrier surface are considerably reduced. Furthermore, due to the reduced depth of the impressed surface, the cementing layer is correspondingly reduced, so that undesired absorptions in the cementing layer or the accumulation of cement bubbles in the frame, are also reduced to the same extent. Thus, the carrier surface for the frame, particularly the cementing surface of the rear member of the finder, is formed as a plane surface, but those parts which carry the frame proper are formed as twisted or arched surfaces, or as inclined flat surfaces.

The carrier zone for the frame to be reflected—which is curved, or inclined flat, or twisted—can be applied on the rear member of the finder, which has flat surfaces and is formed e.g. by molding, or may be formed together with it from one piece. However, it can be also, formed in said member, in a partially or entirely recessed arrangement. This last mentioned procedure is preferred if a block shaped Albada-finder is used, in view of the cementing together of the rear member with the intermediate glass block. The cement used should have the same index of refraction as the body which contains the indentation for the frame carrier zone.

A further improvement of the above described arrangement can be attained by imparting a rippled or pitted surface to the supporting body for carrying the frame to be reflected. Such a structure of the base further increases the brilliance of the reflected frame. This structure of the supporting body can be formed simultaneously with the formation of the carrier member, which serves as the rear member of the finder, as a molded blank piece of glass or synthetic plastic.

The appended drawings diagrammatically illustrate by way of example some specific embodiments of and best modes for carrying out the invention, to which the invention is not limited.

In the drawings—

FIG. 1 illustrates a finder according to the invention in axial sectional view;

FIG. 2 illustrates the rear member of the finder shown in FIG. 1, on an enlarged scale relative to FIG. 1;

FIGS. 3–5 illustrate, by way of example, a twisted frame carrier zone; and

Figure 4:
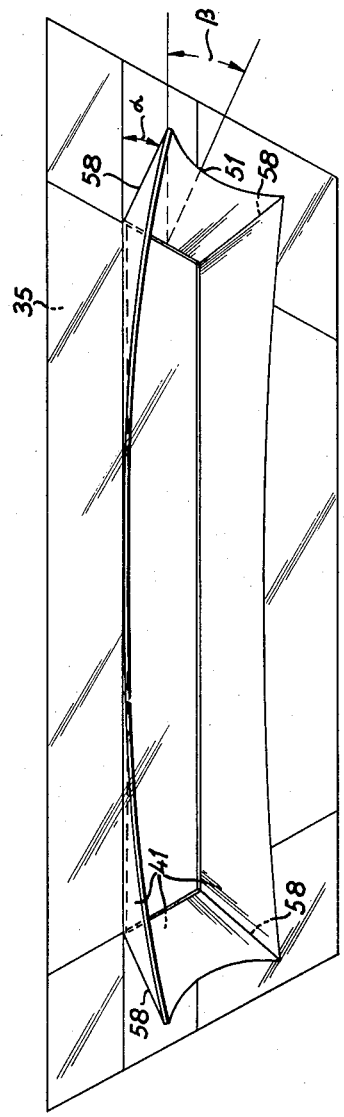

Referring now to the drawings in detail, in FIG. 1 reference numeral 1 denotes the objective lens of a block-shaped Albada-finder. The intermediate block of glass or synthetic plastic is shown at 2 and the rear member at 3. The objective lens 1 carries on its spherical concave surface 4 a partially permeable mirror 5 in a manner known by itself, and is connected with the curved surface 6 of block 2, by means of cemented layer 7. On its side toward the eye 14, block 2 is limited by a plane surface 8 and connected by means of a cement layer 9 with the flat surface 10 of rear member 3. The frame 11, which consists of a highly reflecting metal and is preferably produced by depositing such metal by vaporization, is seated on a frame-shaped zone 12, which is mounted on, or impressed in, the rear member 3. The surface of the zone which carries frame 11 conforms generally to the spherical surface 13 (shown in dotted line). This spherical surface 13, if used, would have been designed in such a manner that it obtains light from the image field portion bordered by the reflected frame. The outer surface 15 of rear member 3, which is toward the eye 14, is plane in the example shown in FIG. 1, but it could be of curved shape, if necessary. This surface 15, as well as the front surface 16 of objective lens 1, can be freed from reflection in conventional manner. The optical axis of the Albada-finder in FIG. 1 is indicated at 17.

The rear member 30 (shown on an enlarged scale in FIG. 2) of an Albada-finder, has a carrier surface 31 for the frame 32 to be reflected. This carrier surface is designed, in the example shown, with a plane surface. It is arranged in recessed relation in member 30 and is inclined by about 11° relative to plane surface 35 of rear member 30 of the Albada-finder. It is indicated at 33 in FIG. 2 that this carrier zone is provided with a rippled or pitted surface. The design of rippling or pitting can be selected in any desired manner. The flank 34 of the recessed carrier surface 31 is plane and carries no metal coating. 117 is the axis of the finder.

FIG. 3 illustrates the rear member 30 of the finder in perspective view, partially in section. In its plane surface 35, which is cemented to the intermediate transparent block of a block-shaped Albada-finder, the carrier surface 41 for the frame 42 to be reflected is arranged in recessed relation, for example by impression. The impressing step produces two different surfaces, i.e. carrier surface 41 and the frontal area 141. The frame 42 is applied to the carrier surface 41 only. The frontal area 141 has no optical effect, because its optical effect is cancelled upon cementing together the members of the finder by means of a cement having the same index of refraction as the carrier of this surface. Therefore, the frontal area or surface 141 is not visible after cementing and has no function. Carrier surface 41 is arranged in this example in such a manner that its inner edges 36, 37 and 38, 39, which border the middle field of viewing, lie in the plane of surface 35. However, the outer edges of carrier surface 41, which lie in the impression of glass member 30, do not extend in one plane. The carrier surface is symmetrically twisted within each side of the rectangular frame, so that the outer edges 50, 51 and 52, 53 are nearer surface 35 than are corners 54, 55, 56 and 57. Thus, each of these outer edges extends in an arch which rests on a twisted surface.

FIG. 4 further illustrates the arrangement of twisted carrier surface 41, whereby, in this case, the perspective view is shown from the rear and from below, respectively, i.e. from the insight direction toward surface 35 but in an inclination corresponding to that of the frame carrier surface in the middle of a longitudinal side, relative to surface 35. The different inclination obtained by the twisted design of frame carrier 41 is thereby entered relative to surface 35. The transparent element 30 of the finder is omitted for the sake of clarity of illustration, in FIG. 4, and only its surface 35 is shown in the drawing. For the sake of clearness, the angles of inclination and the proportions of illustration have been strongly exaggerated in FIG. 4. According to a preferred embodiment, the carrier surface forms an angle $\alpha=13°$ at its corners 58, while the inclination of the carrier surface in the middle of the narrow side of the frame at 51 forms an angle $\beta$ of only 8° with the plane 35. The change from the sharper inclination of the carrier frame at its corners toward the lesser inclination in the middle of its side is continuous, due to the twisting provided for.

Figure 5:
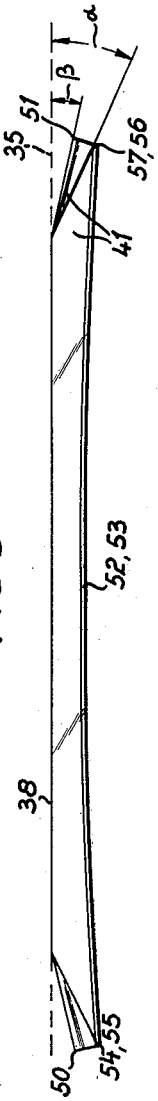

FIG. 5 illustrates only the frame carrier zone according to FIG. 4 in simple lateral view. It can be seen in this figure too that due to its twisting the carrier surface 41 is nearer to surface 35 in the middle of the frame side at 50, 51, 52 and 53, than points 54, 55 and 57, 58 at the edges of frame carrier 41. This is again clarified by angles $\alpha$ and $\beta$ inserted in FIG. 5.

Figure 6:
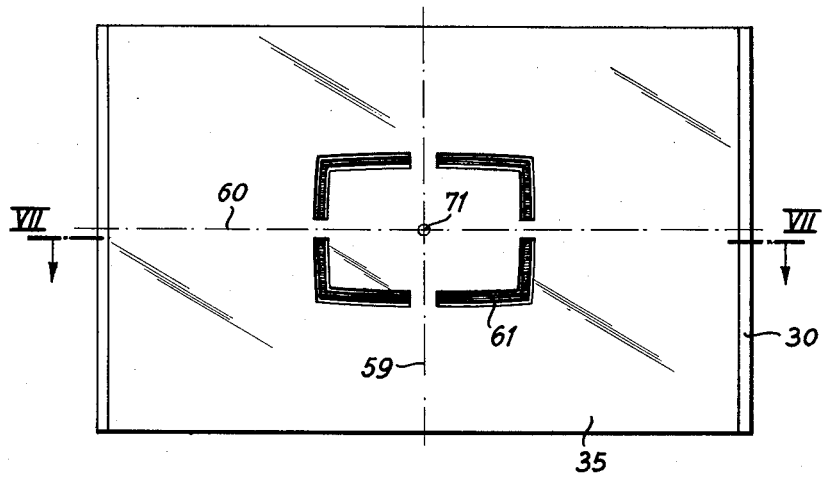
FIGS. 6, 7 and 8 illustrate some further modifications of the frame carrier zone.

FIG. 6 is a top view of surface 35 in the direction of the light incident in the finder with the frame carrier zone sunk therein and frame 61 applied thereto. The frame carrier zone, which is likewise formed with a twist, is composed of four sections which show mirror symmetry in pairs. The symmetry axes 59 and 60 intersect each other in the center 71 of frame 61 and they are parallel with the edges of the impressed frame in each case.

Figure 7:
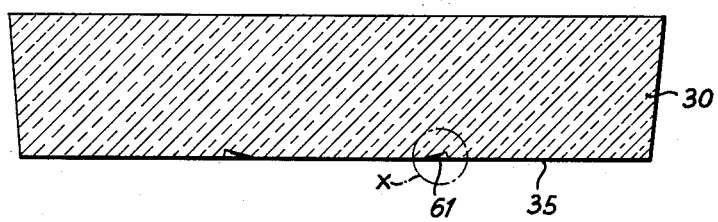

FIG. 7 is a sectional view along line VII—VII of FIG. 6 and shows the sunk arrangement of the frame 61 at x.

Figure 8:
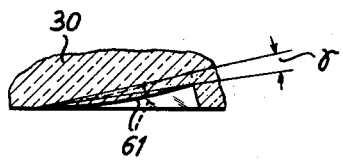

FIG. 8 illustrates this detail x on a greatly enlarged scale. It is clearly shown here that frame 61 rests again on a twisted carrier surface, the different angle of inclination of which amounts to angle γ, which is 5° in the example shown here. In order to illustrate another modified embodiment of the frame carrier surface design, in the example according to FIG. 8, this surface is provided, over its entire length, with a cylindrical curvature, within which the twisting already explained is carried out.

It should be generally noted that the reflector surface of the frame can be made narrower than its carrier surface, so that the non-reflecting part of the carrier surface may extend somewhat beyond the reflecting surface on one or both sides.

As examples of the above mentioned plastic transparent materials, polyacryl and polymethacryl esters, and, as examples of the metals of the frame to be reflected, silver, aluminum and gold, are mentioned.

It will be understood from the above that this invention is not limited to the specific structures, materials, steps and other details specifically described above and can be carried out with various modifications without departing from the scope of the invention as defined in the appended claims.

When in the aforementioned the wording "pitted or rippled surface" is being used in connection with the frame carrier zone it is to be understood that this means a surface structure which is not even but shows periodical or irregular ripples. The ripples however extend more in width rather than in height, thus having a rather low elevation in regard to distance between each other. Width of ripples between lowest or highest point is about 0.01 to 0.03 mm., the depth about 5 to 15μ. The described structure of the surface is continous, e.g. without abrupt changes between depth and height.

What is claimed is:

1. In an "Albada" type finder for photographic cameras including a front lens having an inner concave surface provided with a semi-transparent mirror, a picture defining frame disposed in substantially the focal plane of the mirror for imaging of the frame by the mirror at substantially infinity, a central light permeable block having an outer surface, in superposed relation with said concave inner surface, and an inner surface, and an ocular lens at the inner end of said block, the picture frame being disposed at the junction of said block and said ocular lens: the improvement comprising said ocular lens having a substantially rectangular and plane surface area cemented to the inner surface of said block and substantially perpendicular to the optical axis of the finder; an open rectangular frame supporting zone peripherally bounding and contiguous to said surface area and non-planar with said surface area, said zone comprising zone surfaces sloping laterally outwardly from the edges of said surface area and toward the insight end of said ocular lens, and intersecting at rectilinear diagonals extending between the corners of said surface area and the outer corners of said zone, each of said zone surfaces being convexly arched longitudinally thereof between said diagonals in such manner that the laterally outer edge of each of said zone surfaces is convex toward the plane of said surface area; and a frame of light reflective material substantially covering the surfaces of said zone facing said mirror.

2. The improvement defined in claim 1, in which the laterally outer edge of each of said zone surfaces approaches said plane surface area from one diagonal to substantially the mid-point of the laterally outer edge and then recedes from such plane surface area from such midpoint to the other diagonal.

3. The improvement claimed in claim 1, in which at least several points of each of said zone surfaces have an inclination corresponding to the tangent to a spherical surface having a curvature such as to reflect light rays, passing through the semi-transparent mirror, onto the reflecting surfaces of the mirror.

4. The improvement defined in claim 1, in which the surface of each of said zone surfaces is curved, in a direction extending outwardly from the center of the frame, over at least the outer portion of its lateral extent; the mean value of the radius of curvature in such outwardly extending direction corresponding approximately to the radius of a spherical surface having a curvature such as to reflect light rays, passing through the semi-transparent mirror, onto the reflecting surfaces of the mirror.

5. The improvement defined in claim 1, in which the laterally outer edges of said zone surfaces are formed by the lines of intersection of said zone surfaces with surfaces extending at an angle of not less than 90° to such plane surface area; the inner edges of said zone surfaces being located in a surface which is parallel to said plane surface portion, and substantially co-incident therewith.

6. The improvement defined in claim 1 in which said substantially plane surface area comprises the central portion of a plane surface of said ocular lens; and said zone is formed on such latter plane surface.

7. The improvement defined in claim 6, in which the inner lateral edges of each of said zone surfaces are rectilinear and contiguous with the lateral edges of said plane surface area.

8. The improvement defined in claim 6 in which said frame supporting zone is formed unitarily with said ocular lens.

9. The improvement defined in claim 1 in which said zone is recessed in the surface of said ocular lens facing the inner surface of said block.

10. The improvement defined in claim 1 in which the surface of the frame supporting zone is irergular; and said frame is formed by metal deposited on the surface of said zone.

11. The improvement defined in claim 1 in which the finder is a unitary member, with the central block cemented to the front lens and to the ocular.

12. The improvement defined in claim 11 in which the inner surface of the block is cemented to the ocular by a cement having substantially the same index of refraction as the material of said ocular lens.

13. The improvement defined in claim 1, in which each of said zone surfaces is curved uniformly throughout its length.

References Cited in the file of this patent

UNITED STATES PATENTS

| 2,187,057 | Sauer | Jan. 16, 1940 |

FOREIGN PATENTS

| 996,990 | France | Sept. 5, 1951 |
| 1,004,913 | Germany | Mar. 21, 1957 |